F. T. ALDER.
VEHICLE WHEEL AND SPOKE.
APPLICATION FILED MAR. 29, 1919.
1,349,035.
Patented Aug. 10, 1920.
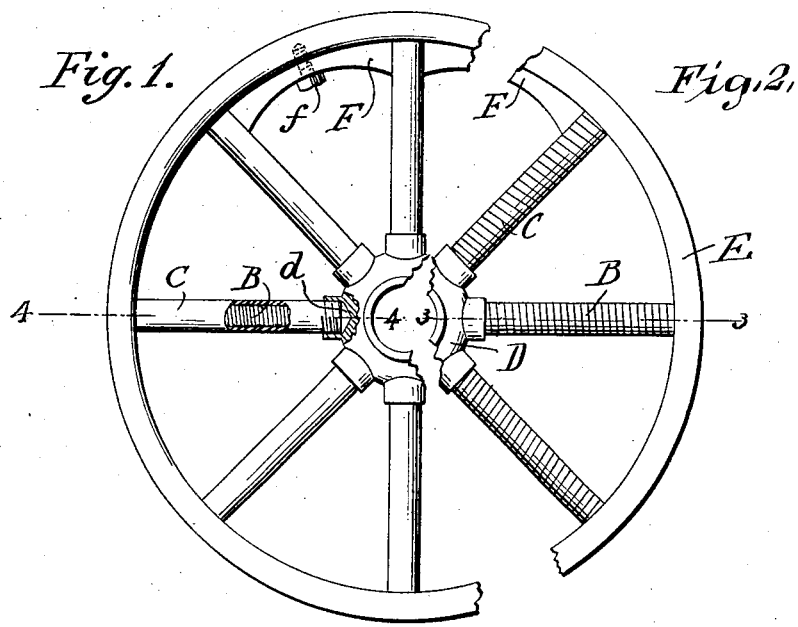
Fig. 1. Fig. 2.
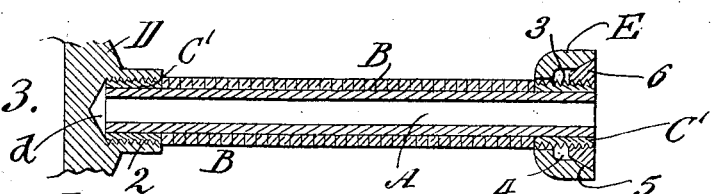
Fig. 3.
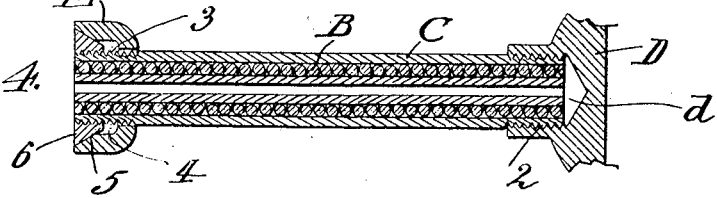
Fig. 4.
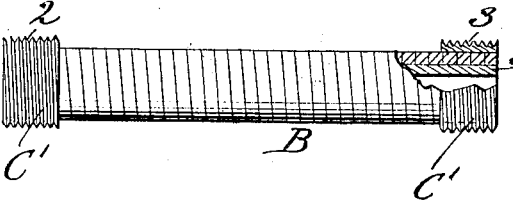
Fig. 5.
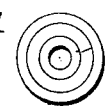
Fig. 6.
INVENTOR
F. T. Alder
BY
*[signature]*
ATTORNEY

UNITED STATES PATENT OFFICE.

FREDERICK T. ALDER, OF MOUNT VERNON, NEW YORK.

VEHICLE WHEEL AND SPOKE.

1,349,035.  Specification of Letters Patent.  Patented Aug. 10, 1920.

Application filed March 29, 1919. Serial No. 286,159.

*To all whom it may concern:*

Be it known that I, FREDERICK T. ALDER, a citizen of the United States, and resident of Mount Vernon, county of Westchester, and State of New York, have invented certain new and useful Improvements in Vehicle Wheels and Spokes, of which the following is a specification.

The present invention relates to vehicle wheels and spokes.

The principal objects of the invention are to provide a wheel of simple construction, attractive appearance and great durability and strength, which is susceptible of production at low manufacturing cost, and comprises simple and durable parts adaptable for being quickly and securely assembled and adjusted.

In carrying out my invention I employ tubular spokes comprising an inner tube having an outer tube embodying a coil of wire closely wound therearound, and novel means for attaching them to the felly and hub and to each other, as hereinafter fully described and specifically set forth in the annexed claims.

In the accompanying drawings, forming part of this specification, Figure 1 is a side view of a section of my improved wheel, part of one of the spokes thereof being broken away. Fig. 2 is a side view of a section of wheel illustrating a modification of spoke construction. Fig. 3 is a longitudinal sectional view drawn on an enlarged scale and taken on the line 3—3 of Fig. 2. Fig. 4 is a similar view taken on the line 4—4 of Fig. 1. Fig. 5 is a side view showing a slight modification of spoke construction; and Fig. 6 is an end view thereof.

In the drawings, A, indicates an inner member embodying a metal tube of suitable diameter, B, indicates an outer tubular member composed of closely coiled wire, and C, C' indicate sleeve-means for holding the said two members together and connecting the spoke to the wheel hub and felly, as hereinafter described.

In the process of manufacture, the wire is closely coiled around the inner tubular member and fixed thereto by any suitable means, as brazing or welding its respective ends to their contiguous coil-parts or to said tubular member. Then the sleeve C, is adjusted and secured to or on the coil member, at its end parts, by either a brazing or welding process, whereby all the parts of the spoke are maintained in fixed relative engagement with each other.

The sleeve member may be of a length equal to the entire length of the spoke, as shown by Fig. 4 of the drawings, or it may comprise two sections C', C', as illustrated by Figs. 3 and 5. In Fig. 3 the sleeve members are shown as abutting against the ends of the coil-member and brazed or welded to said ends and to the end parts of the inner member A, the coil member B, being shorter than said member A, making a spoke of equal diameter throughout its length; or the two sections C', C' of the sleeve member may be forced over and fixed to the coil-member B, as shown by Fig. 5 of the drawings.

The sleeve-member of each spoke is provided, at its inner end with a screw-threaded part 2, and at its outer end with a screw-threaded part 3.

The spoke members A, B and C are preferably composed of steel. But other metals may be advantageously employed; or a combination of metals might be used. When it is desired to construct a very light weight spoke the members A and C, may be composed of aluminum and the coil-member B, of steel or other metal. I therefore do not confine myself to the specific use of any material.

In conjunction with my improved spoke, described above, I use a metal hub D, having a plurality of radially extended, interiorly screw-threaded sockets d, for engagement with the threaded parts 2, of the spokes, and a metal felly E, for engaging the outer ends of the spokes, said felly having a plurality of radial openings 4, for accommodating the outer ends of the spokes.

In the example of my invention illustrated by Figs. 3 and 4 of the drawings the said openings 4, communicate with peripheral recesses 5, of the felly which accommodate counter-sunk nuts 6, said nuts screw-threaded to the parts 3, of the spokes. By this arrangement the spokes may be readily removed and renewed if found desirable; or the spokes may be brazed, welded or otherwise fixed to the felly.

The wire for forming the outer tubular, or coil-member may be either round, in cross section, as shown by Fig. 4 of the drawings, or rectangular, as shown by Fig. 3, but wire of any other cross sectional shape adapted to be closely wound may be employed.

In the process of manufacture the spokes may be individually made, in desirable short lengths, or a plurality may be embodied in an extended length and then sawed into units of the desired length.

By the use of my invention I attain great strength of spoke, whereby a minimum number may be advantageously employed without impairing the general utility and strength of the wheel; thus conserving expense of manufacture.

In the drawings a wheel having but eight spokes is shown (a comparatively small number) and it is believed that this proportion embodies a practicable construction, but I do not confine myself to the use of any specific number of spokes, nor to the exact details of construction shown and described, as under the spirit and scope of my invention I believe that I am entitled to employ variations of detail which may be found practicable in the construction of various wheels.

The wheel is designed especially for use in combination with a detachable rim and tire of the character used in automobiles constructed for passenger service. My improved spokes may also be used in the construction of wheels for trucks having a fixed rim and requiring great strength.

In the construction of heavy wheels, as truck wheels, I may fasten the spokes to the felly by either the electrical or the acetylene process of welding; and strengthening braces, as F, Fig. 1 of the drawings, may be connected between the spokes. These braces may also be welded by means of the acetylene or electrical process; or they may be fastened by means of screws as $f$.

Having thus described my invention, what I claim as new and desire to secure by Letters Patent, is:

1. A vehicle wheel having spokes respectively comprising an inner tubular member and an outer tubular member, said last named member embodying a closely wound coil of wire, and fastening means for fixing said members together, said fastening means engaging the wheel hub and felly.

2. A wheel spoke comprising an inner tube, an outer tube embodying a coil of wire, and fastening means for fixing said parts.

3. A vehicle wheel spoke comprising an inner tube, an outer tube embodying a coil of closely wound wire, and sleeve-means for fixing said parts and for connection with a hub and felly.

4. A vehicle wheel spoke comprising an inner tube, an outer tube embodying a coil of closely wound wire, and sleeve-means for fixing said parts in secure engagement with each other, the said sleeve-means provided with screw-threaded parts for engaging a hub and felly.

In testimony that, I claim the foregoing as my invention, I have signed my name in presence of two witnesses, this eighth day of March, 1919.

FREDERICK T. ALDER.

Witnesses:
A. LENALIE,
GEO. PATTERSON.